US008345616B2

(12) United States Patent  (10) Patent No.: US 8,345,616 B2
Navda et al.  (45) Date of Patent: Jan. 1, 2013

(54) SCHEDULING COMMUNICATIONS IN A MOBILE DEVICE

(75) Inventors: Vishnu Navda, Karnataka (IN); Ramachandran Ramjee, Bangalore (IN); Aaron Schulman, Washington, DC (US); Venkata N. Padmanabhan, Karnataka (IN); Kamal Jain, Washington, DC (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/822,205

(22) Filed: Jun. 24, 2010

(65) Prior Publication Data

US 2011/0317631 A1 Dec. 29, 2011

(51) Int. Cl.
*H04W 4/00* (2009.01)
(52) U.S. Cl. ........................................ 370/329; 455/450
(58) Field of Classification Search .................. 370/328, 370/329; 455/450
See application file for complete search history.

(56) References Cited

U.S. PATENT DOCUMENTS

| 6,002,918 | A | 12/1999 | Heiman et al. | |
|---|---|---|---|---|
| 6,748,233 | B1 | 6/2004 | Arnold et al. | |
| 7,397,803 | B2 | 7/2008 | Love et al. | |
| 2004/0203895 | A1* | 10/2004 | Balasuriya | 455/456.1 |
| 2005/0152280 | A1 | 7/2005 | Pollin et al. | |
| 2006/0160508 | A1 | 7/2006 | Narayanaswami et al. | |
| 2007/0010259 | A1* | 1/2007 | Hoffmann | 455/456.1 |
| 2009/0036172 | A1 | 2/2009 | Almalki | |
| 2011/0153868 | A1* | 6/2011 | Castleberry et al. | 709/246 |
| 2011/0163914 | A1* | 7/2011 | Seymour | 342/357.42 |
| 2012/0020319 | A1* | 1/2012 | Song et al. | 370/330 |

OTHER PUBLICATIONS

Samimi, et al., "Mobile Service Clouds: A Self-managing Infrastructure for Autonomic Mobile Computing Services", Retrieved at << http://users.cis.fiu.edu/~sadjadi/Publications/MobileServiceClouds-ICAC-SelfMan-2006.pdf >>, Proceedings of the Second International Workshop on Self-Managed Networks, Systems & Services, vol. 3996 of Lecture Notes in Computer Science (LNCS), Jun. 2006, pp. 130-141.
Gamal, et al., "Energy-efficient Scheduling of Packet Transmissions over Wireless Networks", Retrieved at << http://isl.stanford.edu/groups/elgamal/abbas_publications/C089.pdf >>, Proceedings of the Conference on Computer Communications, (INFOCOM), 2002, pp. 1773-1782.
Yomo, et al., "Opportunistic Scheduling for Wireless Network Coding", Retrieved at << http://citeseerx.ist.psu.edu/viewdoc/download;jsessionid=320FCD65C6B408CE9CAAE22F9DBAA369?doi=10.1.1.141.3545&rep=rep1&type=pdf >>, IEEE Transactions on Wireless Communications, vol. 8, No. 6, Jun. 2009, pp. 6.
Bhorkar, et al., "Power Optimal Opportunistic Scheduling", Retrieved at << http://www.tcs.tifr.res.in/~borkar/poweropt.pdf >>, IEEE Globecom, 2006, pp. 5.

(Continued)

*Primary Examiner* — Jung Park

(57) ABSTRACT

A method scheduling outgoing communication in a mobile device is provided. The method includes receiving a signal quality profile for an area in which the device is located. The method further includes receiving a signal from a user application stored on the device that requests the mobile device to make the outgoing communication. Additionally, the method includes determining a current location, a speed, a direction, and a signal quality associated with the device and determining whether the signal quality is above a certain threshold. If not, the method includes predicting a future time at which the signal quality will be above the threshold based at least on the current location, the speed, the direction, the signal quality, and the signal quality profile. Finally, the method includes scheduling the outgoing communication from the mobile device at the future time.

20 Claims, 4 Drawing Sheets

OTHER PUBLICATIONS

Anand, et al., "Self-tuning wireless network power management.", Retrieved at << http://notrump.eecs.umich.edu/papers/mobicom03.pdf >>, International Conference on Mobile Computing and Networking, Proceedings of the 9th annual international conference on Mobile computing and networking, Sep. 14-19, 2003, pp. 14.

Ananthanarayanan, et al., "Startrack: a framework for enabling track-based applications", Retrieved at << http://research.microsoft.com/en-us/projects/startrack/startrack.pdf >>, International Conference on Mobile Systems, Applications and Services, Proceedings of the 7th international conference on Mobile systems, applications, and services, Jun. 22-25, 2009, pp. 1-14.

Armstrong, et al., "Efficient and Transparent Dynamic Content Updates for Mobile Clients", Retrieved at << http://www.cs.toronto.edu/~delara/papers/trevor.pdf >>, International Conference on Mobile Systems, Applications and Services, Proceedings of the 4th international conference on Mobile systems, applications and services, Jun. 19-22, 2006, pp. 13.

Bhushan, et al., "Cdma2000 1ev-do revision a: a physical layer and mac layer overview", Retrieved at << http://.ieeexplore.ieee.org/stamp/stamp.jsp?tp=&arnumber=1593549&userType=inst >>, IEEE Communications Magazine, Feb. 2006, pp. 75-87.

Flinn, et al., "Energy-aware adaptation for mobile applications", Retrieved at << http://www.cs.cmu.edu/~satya/docdir/flinn.pdf >>, 17th ACM Symposium on Operating Systems Principles, ACM SIGOPS Operating Systems Review, vol. 33, No. 5, Dec. 1999, pp. 48-63.

Kravets, et al., "Application-driven power management for mobile communication", Retrieved at << http://citeseerx.ist.psu.edu/viewdoc/download?doi=10.1.1.21.7127 >>, Wireless Networks, vol. 6, No. 4, Jul. 2000, pp. 263-277.

Kushner, et al., "Convergence of proportional-fair sharing algorithms under general conditions", Retrieved at << http://citeseerx.ist.psu.edu/viewdoc/download?doi=10.1.1.8.6408&rep=rep1&type=pdf. >>, IEEE Transactions on Wireless Communications, vol. 3, No. 4, Jul. 2004, pp. 1-23.

Liu, et al., "Experiences in a 3g network: interplay between the wireless channel and applications", Retrieved at << https://research.sprintlabs.com/publications/uploads/com0765-liu.pdf >>, International Conference on Mobile Computing and Networking, Proceedings of the 14th ACM international conference on Mobile computing and networking, Sep. 14-19, 2008, pp. 12.

Nicholson, et al., "Breadcrumbs: forecasting mobile connectivity", Retrieved at << http://citeseerx.ist.psu.edu/viewdoc/download?doi=10.1.1.122.7261&rep=rep1&type=pdf >>, International Conference on Mobile Computing and Networking, Proceedings of the 14th ACM international conference on Mobile computing and networking, Sep. 14-19, 2008, pp. 1-14.

Prabhakar, et al., "Energy-efficient transmission over a wireless link via lazy packet scheduling", Retrieved at << http://simula.stanford.edu/papers/wireless/energy/infocom01.pdf >>, In Proceedings of IEEE INFOCOM, 2001, pp. 386-394.

Rahmati, et al., "Context for Wireless: Context-sensitive Energy-efficient Wireless Data Transfer", Retrieved at << http://www.ruf.rice.edu/~mobile/publications/rahmati07mobisys.pdf >>, International Conference on Mobile Systems, Applications and Services, Proceedings of the 5th international conference on Mobile systems, applications and services, Jun. 11-13, 2007, pp. 14.

Tan, et al., "An empirical study on 3G network capacity and performance", Retrieved at << http://ieeexplore.ieee.org/stamp/stamp.jsp?tp=&arnumber=4408581 >>, IEEE Transactions on Mobile Computing, vol. 7, No. 6, Jun. 2008, pp. 737-750.

* cited by examiner

SCHEDULING COMMUNICATIONS IN A MOBILE DEVICE

BACKGROUND

As cellular networks and coverage around the world grow, the popularity of cellular devices has greatly increased. In particular, usage of Internet based mobile applications on smartphones has experienced a drastic increase as well. However, these applications may tend to consume relatively large amounts of energy compared to the battery life of their corresponding devices. Indeed, many such applications are designed to constantly access the cellular network and/or the Internet (e.g., checking email, updating buddy lists on messaging applications, real-time maps, weather, etc.)

A relatively strong contributor to such large energy drains remains the devices' wireless radios. To this end, wireless radios are typically needed to provide the link between a device and a network so that the aforementioned applications can access the Internet. In some cases, the radios add a factor of five or more times the energy cost of their base devices. Furthermore, though some schemes currently exist to facilitate energy conservation in smartphones, most of these solutions remain device centric rather than application centric. Such solutions are limited in their effectiveness against the backdrop of growing Internet traffic on mobile devices.

SUMMARY

Described herein are implementations of various technologies for scheduling communications in a mobile device. Because the wireless radio of a mobile device remains a relatively large contributor to energy consumption, the less activity the radio experiences, the more energy that may be conserved in the mobile device. Furthermore, various technologies described herein may operate under the assumption that a wireless radio may consume relatively less energy under a relatively strong signal quality than under a relatively weak signal quality. As such, various technologies described herein generally seek to schedule communication incoming to and outgoing from the device during periods of relatively strong signal quality.

At a high level, various technologies described herein encompass two aspects of scheduling communication in a mobile device. A first aspect may focus on scheduling communication outgoing from the mobile device. Here, various technologies described herein contemplate a method which may attempt to schedule outgoing communication during instants where the mobile device is in a location having relatively good signal quality. In one implementation, various signal quality profiles may be stored in a remote database. The signal quality profile for a given area may represent the signal qualities at various GPS coordinates within that area. Then, a prediction algorithm may be employed to estimate signal qualities at future times based on the mobile device's current location, trajectory of motion, speed, direction, and the signal quality profiles. As such, the prediction algorithm may determine the best time and/or location at which to perform an outgoing communication for the mobile device.

In another implementation, the prediction algorithm may take fewer inputs to determine when to schedule an outgoing communication. For example, some areas may not have any associated data regarding a signal quality profile. Therefore, the prediction algorithm may simply attempt to schedule outgoing communication whenever the signal qualities the mobile device has experienced in the recent past are above a certain signal threshold. To this end, the prediction algorithm may generally assume that if in the recent past the signal quality for the mobile device has exceeded the signal threshold, then it may be likely that the signal quality for the mobile device is currently exceeding the signal threshold as well.

A second aspect concerns scheduling incoming communication to the mobile device. In one implementation, a cloud server may be contemplated to act as an intermediary or proxy between another remote device, e.g. and Internet server, attempting to send incoming communication to the mobile device. Therefore, any communication attempting to reach the mobile device may first pass through the cloud server. The cloud server may then schedule when such communication is to be forwarded to the mobile device based on the same algorithms described above with regard to scheduling outgoing communication from the mobile device.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to scheduling communication in a mobile device. Various techniques for scheduling communication in a mobile device will be described in more detail with reference to FIGS. 1-4.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
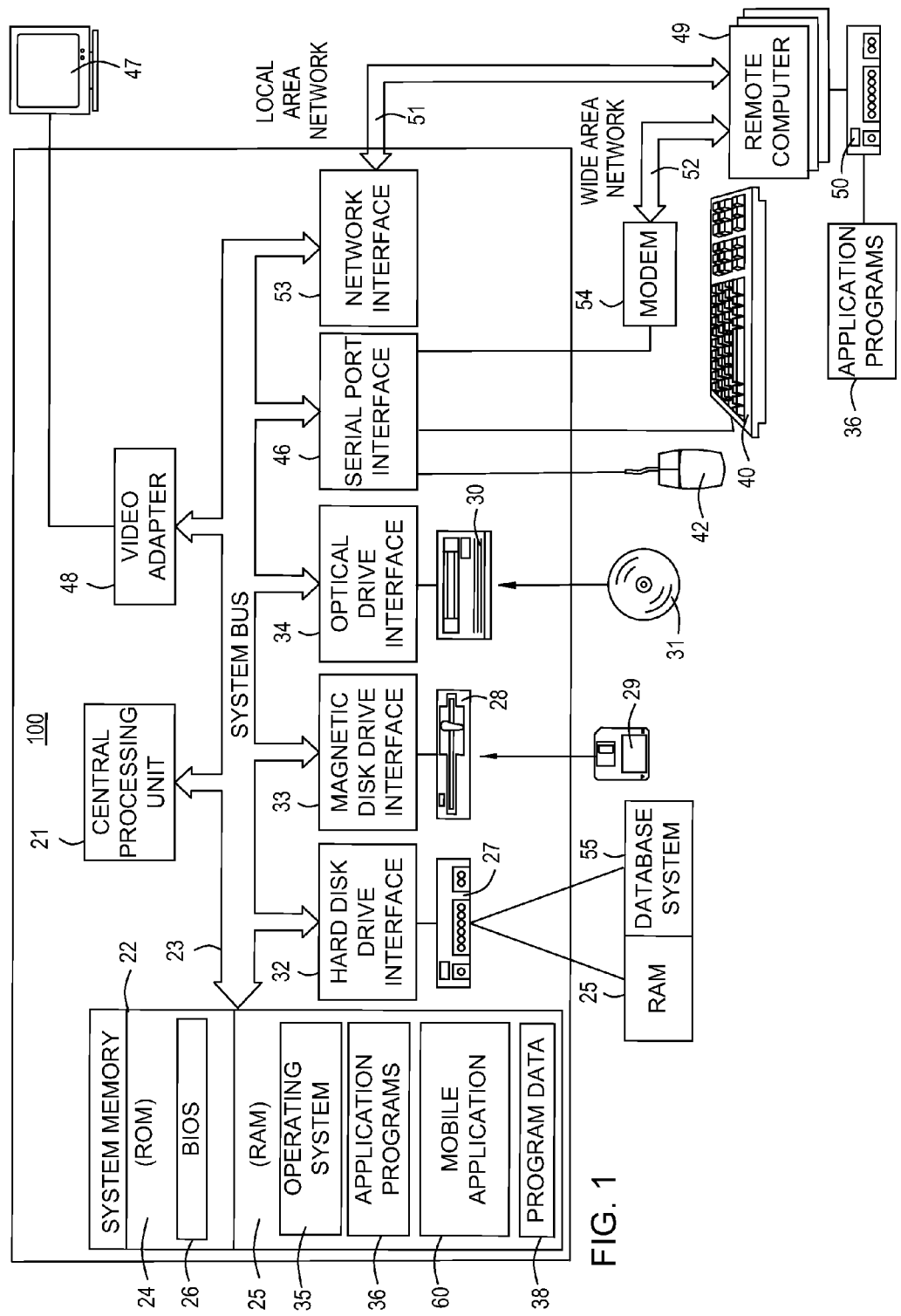
FIG. 1 illustrates a schematic diagram of a mobile device in which the various techniques described herein may be incorporated and practiced.

FIG. 1 illustrates a schematic diagram of a mobile device 100 in which the various technologies described herein may be incorporated and practiced. The mobile device 100 may be a computing system.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a mobile application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The mobile application 60 may be configured to schedule outgoing communication from computing system 100 to a remote computer 49.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52. When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
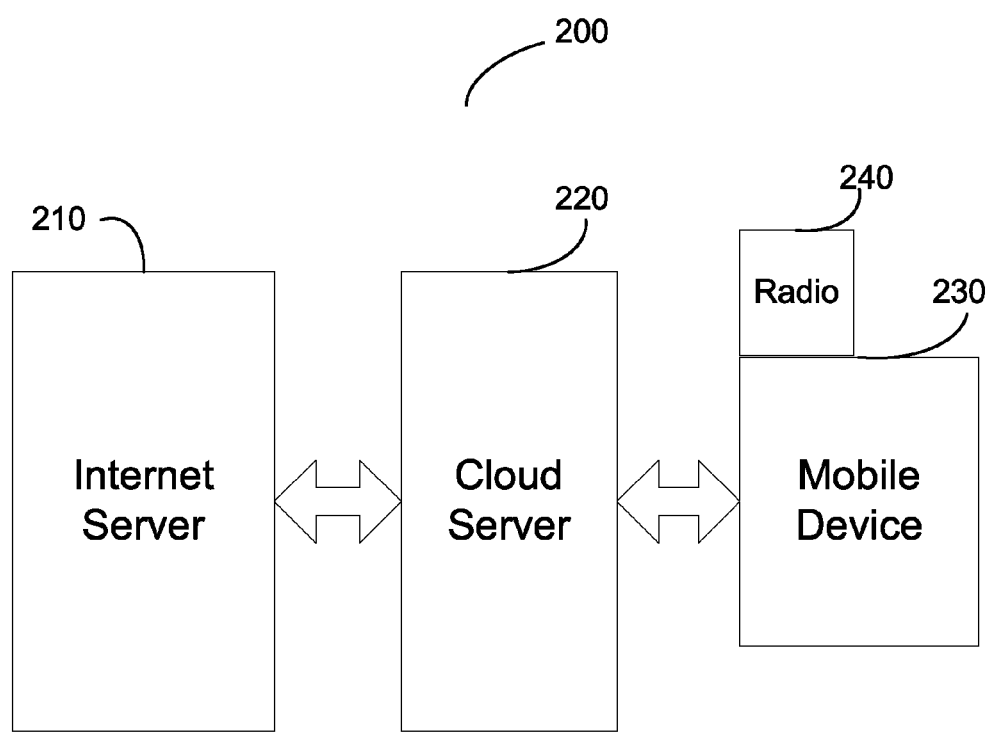
FIG. 2 illustrates a schematic diagram of a mobile network in which the various techniques described herein may be incorporated and practiced.

FIG. 2 illustrates a schematic diagram of a mobile network 200 in which various technologies described herein may be incorporated and practiced. The mobile network 200 may include an Internet server 210, a cloud server 220, and a mobile device 230. The cloud server 220 may act as an intermediary or proxy to facilitate data incoming communication from the Internet server 210 to the mobile device 230. As shall be described in detail with reference to FIG. 4, the cloud server 220 may attempt to schedule incoming communication to the mobile device 230 during periods of time in which the mobile device 230 is experiencing a relatively strong signal quality.

The mobile device 230 may also include a wireless radio 240 to wirelessly communicate with other devices including, but not limited to, Internet server 210 and cloud server 220. As previously mentioned, the wireless radio 240 may consume more energy during periods of relatively weak signal quality than during periods of relatively strong signal quality. In one implementation, the mobile application 60 may be stored on the mobile device 230 to schedule outgoing communication from the mobile device 230 according to the signal quality of the mobile device. Such a scheduling method is further described with reference to FIG. 3.

Figure 3:
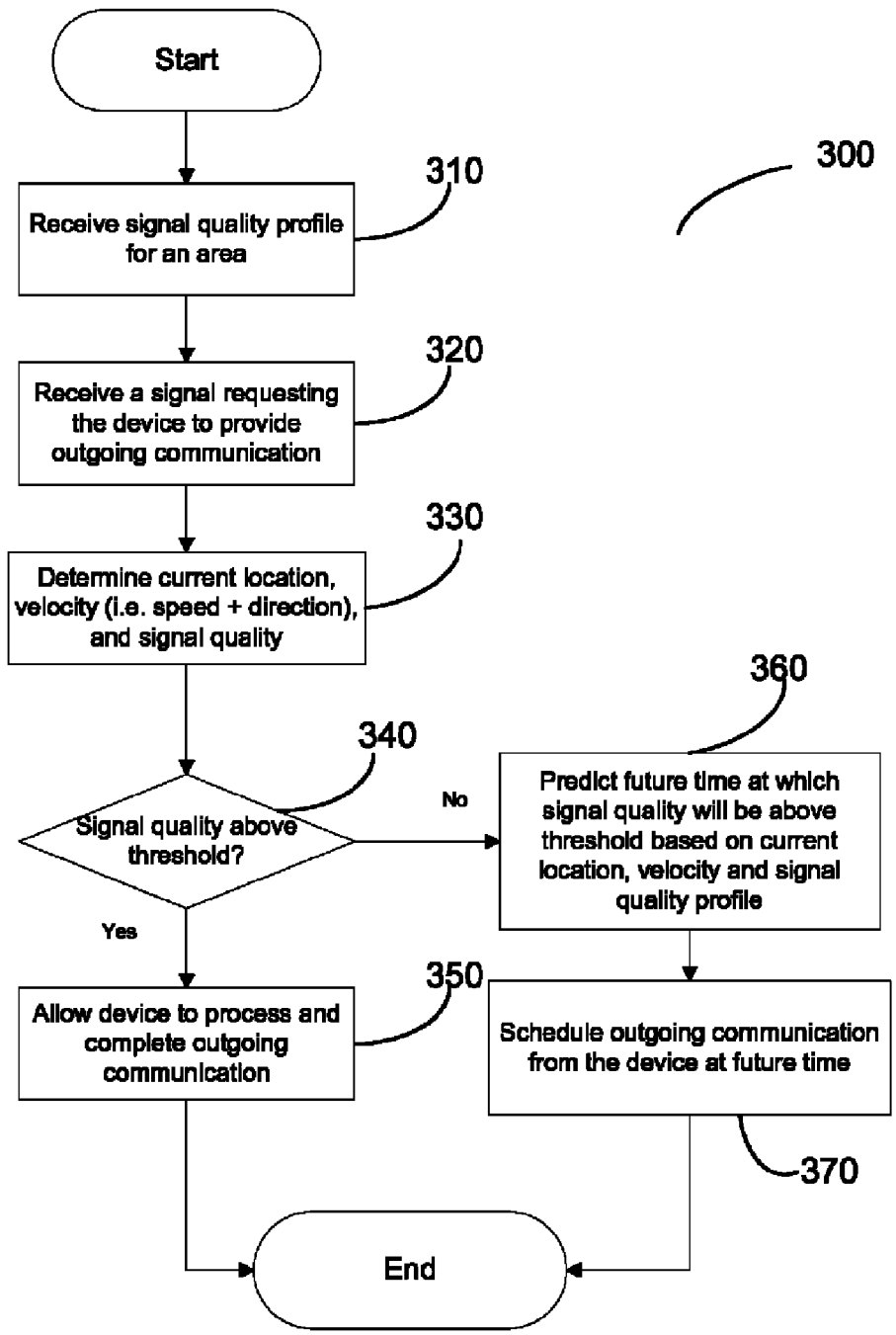
FIG. 3 illustrates a flow diagram of a method for scheduling outgoing communication in a device in accordance with one or more implementations of various techniques described herein.

FIG. 3 illustrates a flow diagram of a method 300 for scheduling outgoing communication for a mobile device 230 in accordance with one or more implementations of various techniques described herein. The following description of method 300 is made with reference to the mobile device 100 of FIG. 1 and mobile network 200 of FIG. 2. It should be understood that while method 300 indicates a particular order of execution of the operations, in some implementations, certain portions of the operations might be executed in a different order. In one implementation, method 300 may be referred to as opportunistic scheduling and performed by the mobile application 60.

At step 310, the mobile application 60 may receive a signal quality profile. A signal quality profile for a given area may provide the signal qualities along tracks, which may be defined as a series of GPS coordinates representing paths that could be taken by a mobile device. For example, a signal quality profile may provide signal qualities at various GPS coordinates in an area. In one implementation, the signal quality profile for a given area may be stored at a remote location, e.g., a cloud server 220, and may be downloaded by the mobile application 60 when the mobile device 230 enters the given area. In another implementation, the signal profile may be overlaid over existing geographical databases, e.g., Google® maps, Yahoo® maps, Bing® maps, and/or the like. For example, different locations or coordinates along such maps in a geographical database may be annotated with data indicating the signal qualities at those locations.

Additionally, obtaining GPS coordinates may be relatively expensive in terms of energy consumption unless it is already being used for another application. Therefore, in another implementation, instead of GPS coordinates, a relative position of the mobile device 230 may be determined using a current signal quality of the mobile device. For example, the mobile application 60 may, using its cellular radio, compare the current signal quality of the mobile device 230 with the closest cell tower or towers in a given area. With this comparison, the closest matching position of the mobile device 230 may be calculated by determining the location at which the mobile device 230 could experience the current signal quality. Such a method may be refined as more signal measurements may be available as the mobile device 230 travels along a given path. Furthermore, when compared with obtaining GPS coordinates, such a method may consume significantly less energy since obtaining signal quality measurements via the cellular radio may be relatively free of cost.

At step 320, a signal may be received by the mobile device 230 requesting the mobile device 230 to make an outgoing communication. In one implementation, the signal may be generated by a user application stored on the mobile device 230. For example, an email application may request the mobile device 230 to communicate with an email server to check for any new emails.

At step 330, the mobile application 60 may determine certain factors associated with the mobile device. These factors may include the current location, speed, direction, signal quality of the device, and the like. Then, at step 340, the mobile application 60 may determine whether the signal quality of the mobile device 230 is above a certain threshold. If the signal quality is above the threshold, the mobile application 60 may allow the mobile device 230 to perform the outgoing communication at step 350.

At step 360, if the signal quality is not above the threshold, the mobile application 60 may predict a future time at which the signal quality may be above the threshold. Such a prediction may use a prediction algorithm that takes into account the current location, speed, and direction of the mobile device 230 as determined at step 330. The signal quality profile received at step 310 is also taken into account by the prediction algorithm to determine when the signal quality maybe above the threshold. Notably, the prediction algorithm may use the direction of the mobile device 230 to account for handoffs from one cell tower to another. For example, consider a scenario where the mobile device 230 may be associated with a first cell tower and may be travelling from the first cell tower to a second cell tower. As the mobile device 230 moves farther away from the first cell tower, its signal quality may decrease. However, as the mobile device 230 moves away from the first cell tower, it may be moving closer to the second cell tower. At some point (e.g., when the signal quality of the mobile device 230 falls below a particular level), the mobile device 230 may be handed off and associated with the second cell tower. Consequently, the mobile device's signal quality may now begin to increase as the mobile device 230 moves in a direction toward the second cell tower. When travelling in the opposite direction from the second tower to the first tower, however, the handoff may occur at a different point since the signal quality of the mobile device may fall below the particular level at a different point. Thus, direction of travel may be taken into account into the prediction algorithm because signal qualities may vary for a particular location as the mobile device 230 approaches the particular location from different directions.

With these factors, the mobile application 60 may schedule the future time for the outgoing communication from the mobile device 230. In this manner, the mobile application 60 may be able to schedule outgoing communications from the mobile device 230 during times when the signal quality is above the threshold. In one implementation, the mobile device 230 may delay the outgoing communication for the user application up until the user application's timeout period. Typically, a timeout period may refer to a set period of time by which a user application is allowed to perform a task. After the timeout period, the user application may be required to terminate performance of the task. For example, an email application may have a timeout period for 60 seconds to establish a connection with an email server to retrieve new email. If at the end of 60 seconds, the email application has failed to establish a connection, the email application may cease requesting communication with the email server. Thus, the mobile application 60 allows delaying the outgoing communication for an application up until its timeout period to avoid termination of the communication.

In one implementation, method 300 may contemplate scheduling outgoing communication with regards to background applications. Background applications may refer to applications that may be executed even while a user is not directly interfacing with the application. For example, typical applications that can be executed in the background may include, but are not limited to, instant messaging, media downloads and uploads, and RSS feeds. Usually, the communications performed by background applications may be considered as non-urgent by a user and may therefore be delayed without the user's notice.

In another implementation, the mobile application 60 may be operable to recognize that certain communication may never be scheduled or delayed. For instance, such communication may typically apply to communication that the user desires to be performed immediately. These communications may include, but are not limited to, voice communication, video communication, and other types of communication designated by the user.

In another implementation, the mobile application 60 described at step 310 may not use a prediction algorithm. For example, if a signal quality profile is not available for a given area, the mobile application 60 may determine whether the signal quality for the mobile device 230 has been above the threshold over a designated period of time in the past. If so, the mobile application 60 may determine that the current signal quality for the mobile device 230 is also likely above the threshold and allow the outgoing communication to be performed. If not, the mobile application 60 may delay the outgoing communication for a predetermined period of time.

In yet another implementation, the mobile application 60 may regulate the actions of the wireless radio 240 for the mobile device 230. The wireless radio 240 may typically be left active for some period of time even following the end of a particular communication. While the wireless radio 240 is active, it may be consuming energy that could otherwise be saved. Therefore, to reduce the activity of the wireless radio, the mobile application 60 may determine when no communication is to occur with mobile device 230 for a predetermined period of time. If the mobile application 60 makes such a determination, it may quickly place the wireless radio 240 of the mobile device 230 into an idle state. While in the idle state, the wireless radio 240 may consume less power than when it is actively transmitting communication. For example, the mobile application 60 may use the Fast Dormancy API, which enables a wireless radio to be quickly placed into an idle state to avoid the energy consumption associated with the radio being left active.

The method 300 of scheduling outgoing mobile communication for a mobile device 230, described above, may have an advantage of enabling the mobile device 230 to consume less energy with regard to its radio. To this end, the method 300 may schedule outgoing communication for a user application only when the signal quality is above a certain threshold, i.e., when the signal quality is relatively strong. Additionally, the method 300 may have a further advantage for providing energy savings for all user applications. This may be in contrast to current schemes, which may rely on developers for each user application to implement their own energy saving frameworks.

Figure 4:
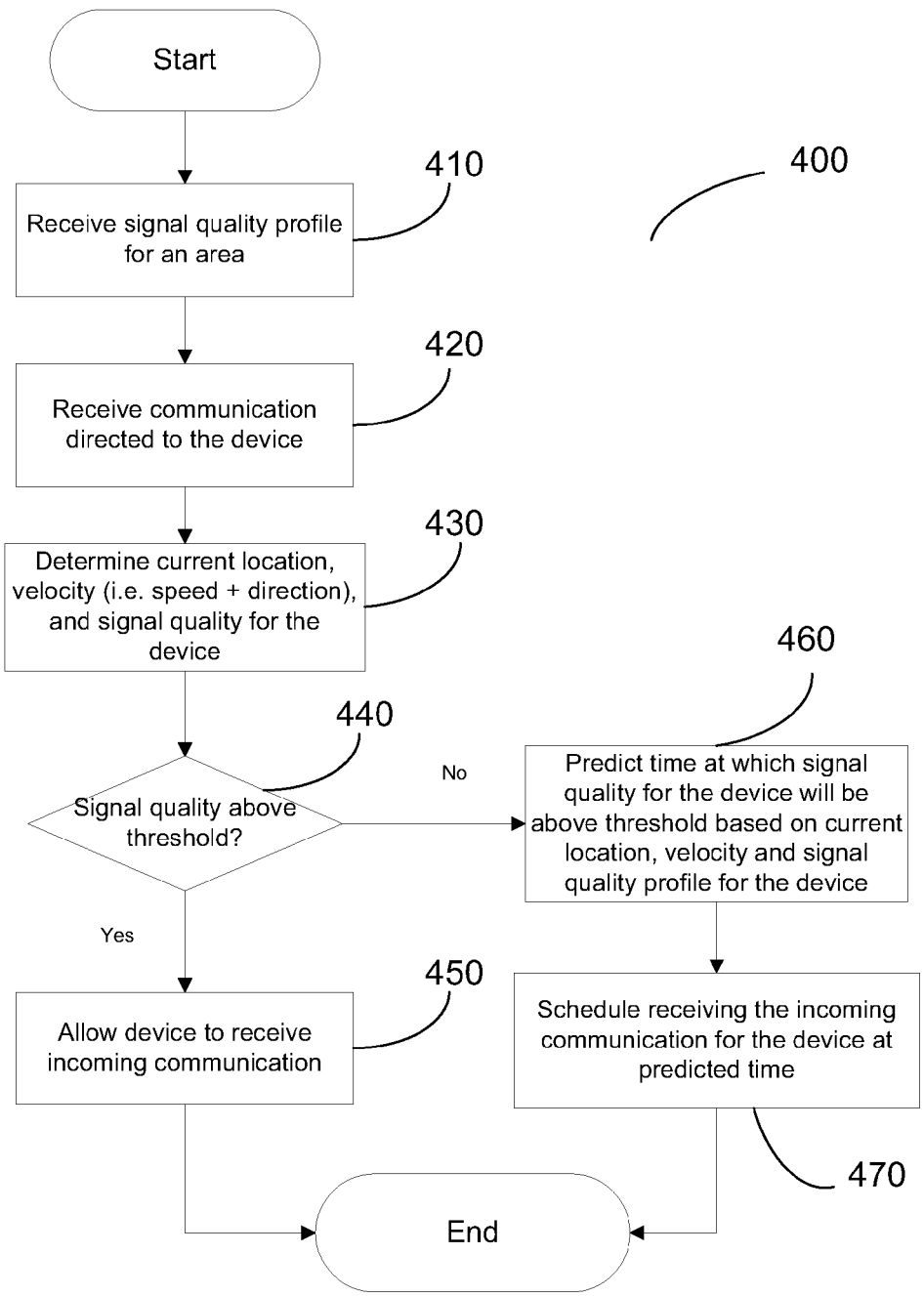
FIG. 4 illustrates a flow diagram of a method for scheduling incoming communication in a device in accordance with one or more implementations of various techniques described herein.

FIG. 4 illustrates a flow diagram of a method 400 for scheduling incoming mobile communication for a mobile device 230 in accordance with one or more implementations of various techniques described herein. The following description of method 400 is made with reference to mobile device 100 of FIG. 1 and mobile network 200 of FIG. 2. It should be understood that while the method 400 indicates a particular order of execution of the operations, in some implementations, certain portions of the operations might be executed in a different order. In one implementation, method 400 is performed by the mobile application 60.

At step 410, the cloud server 220 may receive or determine the signal quality profile for a given area in which the mobile device 230 is presently located. As previously mentioned, the signal quality profile may be stored on the cloud server 220 itself and may provide the signal qualities for the area along various tracks or GPS coordinates. In one implementation, the signal quality profile received by the cloud server 220 at step 410 may be identical to signal quality profile received by the mobile device 230 at step 310 in FIG. 3.

At step 420, the cloud server 220 may receive communication directed toward the mobile device 230. Such communication may be viewed by the mobile device 230 as incoming communication. To this end, the cloud server 220 may act as an intermediary to facilitate incoming communication to the mobile device 230. For example, an email server may want to send new emails to be downloaded by the mobile device 230. Before the emails reach the mobile device 230, the emails may first be handled by the cloud server 220.

As step 430, the cloud server 220 may determine the current location, speed, direction and signal quality of the mobile device 230. Then, at step 440, the cloud server 220 may determine whether the signal quality of the mobile device 230 is above a certain threshold. If the signal quality is above the threshold, the cloud server 220 may allow the mobile device 230 to receive the incoming communication at step 450.

At step 460, if the signal quality is not above the threshold, the cloud server 220 may predict the time at which the signal quality may be above the threshold in the future. To make such a prediction, the cloud server 220 may implement a prediction algorithm that takes into account the current location, speed, and direction of the mobile device 230 as determined at step 430. Additionally, the prediction algorithm may use the signal quality profile received at step 410 as another input.

In one implementation, the prediction algorithm implemented by the cloud server 220 may also predict the location of the mobile device 230 in addition to the time at which the signal quality for the mobile device 230 will be above the threshold. If at the predicted time the mobile device 230 is not at or near the predicted location, the mobile device 230 may update the cloud server 220 with its current location. Furthermore, in order to reduce the number of communications the mobile device 230 may make with the cloud server 220, the update may be piggybacked onto other outgoing communications. For example, if the mobile device 230 is ready to perform an outgoing communication for a user application, the mobile device 230 may also send an update of its location to the cloud server 220 along with the outgoing communication for the user application.

An advantage of method 400 includes enabling the mobile device 230 to consume less energy with regard to its radio. As previously mentioned, the radio of the mobile device 230 may consume less energy with a relatively strong signal compared to a relatively weak signal. To this end, method 400 may schedule incoming communication for a user application only when the signal quality is above a certain threshold, i.e., when the signal quality is relatively strong. As a result, the mobile application 60 may enable the mobile device 230 as a whole to consume less energy, thereby increasing battery life for the mobile device 230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a request to send an outgoing communication from a mobile device;
determining whether a signal quality of the mobile device with respect to one or more cell towers is above a predetermined threshold;
in an instance when the signal quality of the mobile device with respect to the one or more cell towers is less than the predetermined threshold, predicting a future time at which the signal quality of the mobile device with respect to the one or more cell towers will be above the predetermined threshold, the predicting being based on a current location of the mobile device, a speed of the mobile device, a direction of the mobile device, a signal quality profile for an area in which the mobile device is located, or combinations thereof; and
scheduling the outgoing communication from the mobile device at the future time when the signal quality of the mobile device with respect to the one or more cell towers is predicted to be above the predetermined threshold.

2. The method of claim 1 further comprising immediately sending another outgoing communication out of the mobile device in another instance responsive to determining that the signal quality is above the predetermined threshold.

3. The method of claim 1, wherein the outgoing communication is received from a user application stored on the mobile device.

4. The method of claim 1, wherein:
the predicting is based on the signal quality profile, and
the signal quality profile is stored on a cloud server.

5. The method of claim 1, wherein the future time is within a timeout period associated with a user application on the mobile device.

6. The method of claim 1, wherein:
the predicting is based on the signal quality profile, and
the signal quality profile for the area provides a plurality of signal qualities at a plurality of Global Positioning System coordinates within the area.

7. The method of claim 1, wherein:
the predicting is based on the signal quality profile, and
the signal quality profile is overlaid over an existing geographical database.

8. The method of claim 1, further comprising:
determining that the mobile device has not sent or received data for a predetermined period of time; and
placing a wireless radio of the mobile device into an idle state in an instance when it is determined that the mobile device has not sent or received the data for the predetermined period of time.

9. A method comprising:
receiving a request to send an incoming communication to a mobile device;
determining whether a signal quality of the mobile device with respect to one or more cell towers is above a predetermined threshold;
in an instance when the signal quality of the mobile device with respect to the one or more cell towers is not above the predetermined threshold, predicting a future time at which the signal quality of the mobile device with respect to the one or more cell towers will be above the predetermined threshold, the predicting being based on a current location of the mobile device, a speed of the mobile device, a direction of the mobile device, a signal quality profile for an area in which the mobile device is located, or combinations thereof; and
scheduling the incoming communication to the mobile device at the future time when the signal quality of the mobile device with respect to the one or more cell towers is predicted to be above the predetermined threshold.

10. The method of claim 9, wherein the request is received by a cloud server before the incoming communication reaches the mobile device.

11. The method of claim 10, wherein:
the predicting is based on the signal quality profile, and
the signal quality profile is stored on the cloud server.

12. The method of claim 9, further comprising immediately sending another incoming communication to the mobile device in another instance responsive to determining that the signal quality is above the predetermined threshold.

13. The method of claim 9, wherein the one or more cell towers include a cell tower that is closest to the mobile device.

14. A method for scheduling an incoming communication to a mobile device, the method comprising:
receiving a request to send the incoming communication to the mobile device;
determining whether a signal quality of the mobile device is above a predetermined threshold;
in an instance when the signal quality is not above the predetermined threshold, predicting a future time at which the signal quality will be above the predetermined threshold based on a current location, a speed, a direction of the mobile device, a signal quality profile for an area in which the mobile device is located, or combinations thereof;
scheduling the incoming communication to the mobile device at the future time;
predicting a future location associated with the future time at which the signal quality will be above the predetermined threshold; and
updating a cloud server with a new location associated with the mobile device in an instance when, at the future time, the new location does not match the future location.

15. The method of claim 14, performed by the cloud server.

16. The method of claim 14, wherein the updating comprises receiving the new location from the mobile device.

17. One or more computer-readable memory devices or storage devices comprising instructions which, when executed by one or more processing units, cause the one or more processing units to perform the method of claim 14.

18. A mobile device, comprising:
a processor;
a wireless radio; and a memory comprising program instructions that, when executed by the processor, configure the processor to perform the method of claim 1.

19. One or more computer-readable memory devices or storage devices comprising instructions which, when executed by one or more processing units, cause the one or more processing units to perform the method of claim 9.

20. A server comprising:
the one or more computer-readable memory devices or storage devices of claim 19; and
the one or more processing units.

* * * * *